United States Patent
Xu et al.

(10) Patent No.: US 11,403,271 B2
(45) Date of Patent: Aug. 2, 2022

(54) NATIVE APPLICATION CONTENT VERIFICATION

(71) Applicant: Google LLC, Mountain View, CA (US)

(72) Inventors: Hui Xu, Sunnyvale, CA (US); Erik Hendriks, Sunnyvale, CA (US); Chen Wang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 338 days.

(21) Appl. No.: 16/101,922

(22) Filed: Aug. 13, 2018

(65) Prior Publication Data

US 2018/0349435 A1    Dec. 6, 2018

Related U.S. Application Data (63) Continuation of application No. 14/203,774, filed on Mar. 11, 2014, now Pat. No. 10,061,796.

(51) Int. Cl.
| | | |
|---|---|---|
| *G06F 16/951* | (2019.01) | |
| *G06F 16/953* | (2019.01) | |
| *G06F 16/22* | (2019.01) | |
| *G06F 16/23* | (2019.01) | |
| *H04L 67/303* | (2022.01) | |

(52) U.S. Cl.
CPC .......... *G06F 16/22* (2019.01); *G06F 16/2365* (2019.01); *G06F 16/951* (2019.01); *G06F 16/953* (2019.01); *H04L 67/303* (2013.01)

(58) Field of Classification Search
CPC .............................. G06F 16/2365; G06F 16/951
See application file for complete search history.

(56) References Cited

U.S. PATENT DOCUMENTS

| | | | |
|---|---|---|---|
| 7,617,225 B2 | 11/2009 | Arrouye | |
| 8,086,957 B2 | 12/2011 | Bauchot | |
| 8,458,384 B2 | 6/2013 | Johnson | |
| 8,510,764 B1 | 8/2013 | Deselaers | |
| 8,515,979 B2 | 8/2013 | Mehta | |
| 8,543,675 B1* | 9/2013 | Yiu | G06F 16/957 709/245 |
| 8,554,345 B2 | 10/2013 | Fernandez | |
| 8,595,450 B2 | 11/2013 | Nguyen | |
| 2003/0172063 A1 | 9/2003 | Gutta et al. | |
| 2004/0030882 A1 | 2/2004 | Forman | |

(Continued)

FOREIGN PATENT DOCUMENTS

| | | |
|---|---|---|
| CN | 101488997 A | 7/2009 |
| EP | 2474905 | 7/2012 |

(Continued)

OTHER PUBLICATIONS

CN Office Action issued in Chinese Application No. 201580025199.6, dated Dec. 29, 2018, 12 pages (English translation).

(Continued)

*Primary Examiner* — Ashish Thomas
*Assistant Examiner* — Jedidiah P Ferrer
(74) *Attorney, Agent, or Firm* — Fish & Richardson P.C.

(57) ABSTRACT

Methods, systems, and apparatus, including computer programs encoded on a computer storage medium, for verifying consistency between content of a native application and content of a corresponding resource that is provided separately from the content of the native application.

12 Claims, 5 Drawing Sheets

(56) References Cited

U.S. PATENT DOCUMENTS

| | | | |
|---|---|---|---|
| 2006/0106866 A1 | 5/2006 | Green | |
| 2007/0130123 A1* | 6/2007 | Majumder | G06F 16/3347 |
| | | | 707/999.003 |
| 2007/0209080 A1 | 9/2007 | Ture | |
| 2008/0134049 A1 | 6/2008 | Gupta | |
| 2010/0257466 A1 | 10/2010 | Wroblewski | |
| 2010/0306191 A1 | 12/2010 | LeBeau | |
| 2011/0252038 A1 | 10/2011 | Schmidt | |
| 2011/0314004 A1 | 12/2011 | Mehta | |
| 2012/0124061 A1* | 5/2012 | Macbeth | G06F 16/9535 |
| | | | 707/749 |
| 2012/0179706 A1 | 7/2012 | Hobbs | |
| 2012/0179955 A1 | 7/2012 | French | |
| 2012/0284247 A1 | 11/2012 | Jiang | |
| 2012/0290584 A1 | 11/2012 | De | |
| 2012/0303677 A1* | 11/2012 | Peh | G06F 16/2471 |
| | | | 707/809 |
| 2012/0316955 A1 | 12/2012 | Panguluri et al. | |
| 2012/0323898 A1* | 12/2012 | Kumar | G06F 16/957 |
| | | | 707/723 |
| 2013/0006897 A1 | 1/2013 | Jain | |
| 2013/0110815 A1 | 5/2013 | Tankovich | |
| 2013/0111328 A1 | 5/2013 | Khanna | |
| 2013/0122861 A1 | 5/2013 | Kim | |
| 2013/0124606 A1 | 5/2013 | Carpenter | |
| 2013/0191360 A1 | 7/2013 | Burkard | |
| 2013/0232256 A1 | 9/2013 | Lee | |
| 2013/0298007 A1 | 11/2013 | Cullen | |
| 2013/0304729 A1* | 11/2013 | Jiang | G06F 16/9558 |
| | | | 707/723 |
| 2013/0325856 A1 | 12/2013 | Soto | |
| 2014/0006409 A1 | 1/2014 | Prosnitz et al. | |
| 2014/0040226 A1 | 2/2014 | Sadhukha et al. | |
| 2014/0244786 A1 | 8/2014 | Shapira et al. | |
| 2015/0081764 A1 | 3/2015 | Zhao | |

FOREIGN PATENT DOCUMENTS

| | | |
|---|---|---|
| EP | 2495670 | 9/2012 |
| RU | 2456661 C2 | 7/2017 |

OTHER PUBLICATIONS

EP Office Action issued in European Application No. 15711981.9, dated Mar. 1, 2019, 8 pages.

RU Decision to Grant in Russian Appln. No. 2018143244, dated Nov. 26, 2019, 20 pages (with English translation).

"Adding deep linking to Google+ posts shared from your iOS app," [online][Retrieved on Jan. 7, 2014]; Retrieved from the Internet URL: https://developers.google.com/+/mobile/ios/share/deep-link; 3 pages.

"App Linking," [online][Retrieved on Jan. 7, 2014]; Retrieved from the Internet URL: https://developers.facebook.com/docs/android/link-to-your-native-app/; 14 pages.

"Class Gecko View Content," [online][Retrieved on Jan. 2, 2014]; Retrieved from the Internet URL: people.mozilla.org/~mfinkle/geckoview/docs/org/Mozilla/gecko/GeckoViewContent.html; 4 pages.

"Deeplink.me Lets Mobile Users Navigate Through a "Web" of Apps," [online][Retrieved on Dec. 13, 2013]; Retrieved from the Internet URL: techcrunch.com/2013/05/22/new-service-called-deeplink-me-will-let-mobile-users-navigate-through-a-web-of-apps/; 8 pages.

"Frequently Asked Questions—General Information," [online][Retrieved on Jan. 7, 2014]; Retrieved from the Internet URL: https://linksmanager.com/Frequently+Asked+Questions+-General+Information; 8 pages.

"Google's Search Results Can Deep-Link to Your Android Apps," [online][Retrieved on Dec. 13, 2013]; Retrieved from the Internet URL: techcrunch.com/2013/10/31/android-4-4-kitkat-app-indexing/; 6 pages.

"How to determine when an application is fully launched?" [online][Retrieved on Jan. 2, 2014]; Retrieved from the Internet URL: social.msdn.microsoft.com/Forums/en-US/27e7353-eb4b-4e23-bf56-84f3efbbecba/how-to-determine-when-an-application-is-fully-launched; 5 pages.

"How to get a deep link of my application from the Windows Phone Marketplace using .NET code?" [online][Retrieved on Dec. 13, 2013]; Retrieved from stackoverflow.com/questions/13639564/how-to-get-a-deep-link-of-my-application-from-the-windows-phone-marketplace-usin; 2 pages.

"Indexing apps just like websites," [online][Retrieved on Dec. 13, 2013]; Retrieved from the Internet URL: googlewebmastercentral.blogspot.com/2013/10/indexing-apps-just-like-websites.html; 4 pages.

"Instant Pages on Google Chrome," [online][Retrieved on Dec. 16, 2013]; Retrieved from the Internet URL: chrome.blogspot.jp/2011/08/instant-pages-on-google-chrome.html; 3 pages.

"Mobile deep linking," [online][Retrieved on Dec. 13, 2013]; Retrieved from the Internet URL: en.wikipedia.org/wiki/Mobile_deep_linking; 2 pages.

"NSApplication Class Reference," [online][Retrieved on Jan. 2, 2014]; Retrieved from the Internet URL: https://developer.apple.com/library/mac/documentation/cocoa/reference/applicationkit/classes/NSApplication_Class/Reference/Reference.html; 66 pages.

"Ready for a "Web" of Apps? Quixey Launches AppURL, A New Way to Enable Deep Linking Across Mobile Applications," [online][Retrieved on Dec. 13, 2013]; Retrieved from the Internet URL: techcrunch.com/2013/08/02/ready-for-a-web-of-apps-quixey-launches-appurl-a-new-way-to-enable-deep-linking-across-mobile-applications/; 8 pages.

"Seven Tips for Supercharging Your Links," [online][Retrieved on Jan. 7, 2014]; Retrieved from the Internet URL: goarticles.com/article/Seven-Tips-For-Supercharging-Your-Links/3056299/; 5 pages.

"Sharing to Google+ from your Android app," [online][Retrieved on Jan. 7, 2014]; Retrieved from the Internet URL: https://developers.google.com/+/mobile/android/share/#handling_incoming_deep_links; 2 pages.

International Search Report and Written Opinion in International Application No. PCT/US2015/019603, dated Jun. 16, 2015, 13 pages.

Kumar et al., :Duplicate and Near Duplicate Documents Detection: A Review, European Journal of Scientific Research, vol. 32, No. 4, Jun. 1, 2009, pp. 514-527.

Lee et al., "An Efficient Similarity Join Algorithm with Cosine Similarity Predicate," Aug. 30, 2010, Database and Expert Systems Applications, Springer Berlin Heidelberg, Berlin, Heidelberg, pp. 422-436.

Office Action issued in Russian Application No. 2016139613, dated Apr. 10, 2018, 18 pages (with English translation).

Ribeiro et al., "Generalizing prefix filtering to improve set similarity joins," Information Systems, Pergamon Press, Oxford, GB, vol. 36, No. 1, Mar. 1, 2011, pp. 62-78.

Xiao et al., "Top-k Set Similarity Joins," Data Engineering, 2009. ICDE '09. IEEE 25th International Conference on, IEEE Piscataway, NJ, USA, Mar. 29, 2009, pp. 916-927.

RU Office Action and Search Report in Russian Application No. 2018143244, dated Sep. 25, 2019, 12 pages (with English translation).

\* cited by examiner

NATIVE APPLICATION CONTENT VERIFICATION

CROSS-REFERENCE TO RELATED APPLICATION

This application is a continuation of U.S. application Ser. No. 14/203,774, filed Mar. 11, 2014, the contents of which are incorporated by reference herein.

BACKGROUND

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide information, such as on-line encyclopedias, movie databases, news, etc.

A variety of search engines are available for identifying particular resources accessible over the Internet. These search engines crawl and index the various web page resources. The search engines then use the indexes to determine which resources are most responsive to search queries and provide search results that link to the resources in response to the queries.

With the advent of tablet computers and smart phones, native applications that facilitate the performance of the same functions facilitated by the use of web page resources, or the provisioning of the same content by the use of web pages, are now being provided in large numbers.

SUMMARY

This specification describes technologies for verifying native application content.

In general, one innovative aspect of the subject matter described in this specification can be embodied in methods that include the actions of accessing data describing, for a native application, address pairs of first addresses and second addresses, each address pair being a first address and a corresponding second address, each first address being accessible by the native application and from which the native application receives first content, and each second address being an address for a web resource that respectively provides second content; for each address pair: receiving the first content for the first address, receiving the second content for the second address, determining whether the first content and the second content are consistent content, and for only each address pair for which the first content and the second content are determined to be consistent content, validating the address pair and storing in an index validation data for the address pair. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. A search engine verifies that content of a native application is consistent with content of a corresponding web site before indexing a link for the native application for the content. The verification ensures that the search engine, when serving native application search results responsive to a query, is providing access to information that will satisfy users' informational needs.

In some implementations, a search engine need only index the content that is provided in a consistent manner by a website and by native applications in one index, and not separately in an index for web resources and another index for native applications. This reduces overall maintenance of the two corpora.

In some implementations, the validation facilities the serving of native application search results for native applications that are known to provide consistent content with a web resource. Thus, the web resource can be used as scoring proxy for the native application. This allows for a consistent scoring between a native application and a corresponding resource when scoring and ranking search results.

Finally, by using a variety of content verification techniques, the verification process is robust with respect various formatting and display differences between the native application and a corresponding web resource.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

As used herein, a native application operates independent of a browser application on the user device. A native application is an application specifically designed to run on a particular user device operating system and machine firmware and not within a browser. Native applications thus differ from browsers, browser-based applications and browser-rendered resources. The latter require all, or at least some, elements or instructions downloaded from a web server each time they are instantiated or rendered. Browser-based applications and browser-rendered resources can be processed by all web-capable mobile devices within the browser and thus are not operating system specific as are native applications. Furthermore, as used herein, a native application search result is a search result that corresponds to a particular native application and that, when selected, invokes the particular native application.

A publisher (or third parties) may provide content addresses (e.g., URI's, URL's, or command line parameters) for a native application and a corresponding web resource addresses that are purported to provide the same or similar content as the native application. Such content is referred to as "consistent content" as it is provided both by the native application and the web resource. However, for a variety of reasons, the content provided by the native application may be inconsistent with the content provided by the web resource. The inconsistency may be due to an incorrect address specification, failure to maintain a back-end data served to the native application, or any other reason that may cause inconsistencies.

Accordingly, a system, such as a search engine, verifies content between a native application and a web resource. In some implementations, the system accesses data describing, for a native application, address pairs of first addresses and second addresses. Each address pair defines a first address and a corresponding second address, where each first address is accessible by the native application and from which the native application receives first content, and each second address is an address for a web resource that respectively provides second content. For each address pair, the system receives the first content for the first address and the second content for the second address. The system then determines whether the first content and the second content are consistent content. If the content is consistent, then the address pair is verified. The content is determined to be consistent if one or more comparison processes, such as entity matching, n-gram similarity, phrase matching, and feature similarity, indicate a threshold level of consistency between the first and second content. For only the address pairs for which the first content and the second content are determined to be consistent content, the system stores in an index validation data for the address pair.

The validation data facilities the serving of native application search results for native applications that are known to provide consistent content with a web resource. For a search operation, the system receives a search request for a user device. The search request includes a query and data for identifying native applications installed on the user device. The system also receives data identifying web resources responsive to the query. The system then determines if any of the web resource of the web resources responsive to the query includes content for which consistent content is accessible by a native application installed on the user device. In response to a positive determination, the system generates a native application search result that causes the native application installed on the user device to request the consistent content when the native application search result is selected on the user device. Web resource search results and the native application search result are then provided to the user device.

These features and other features are described in more detail below.

Figure 1:
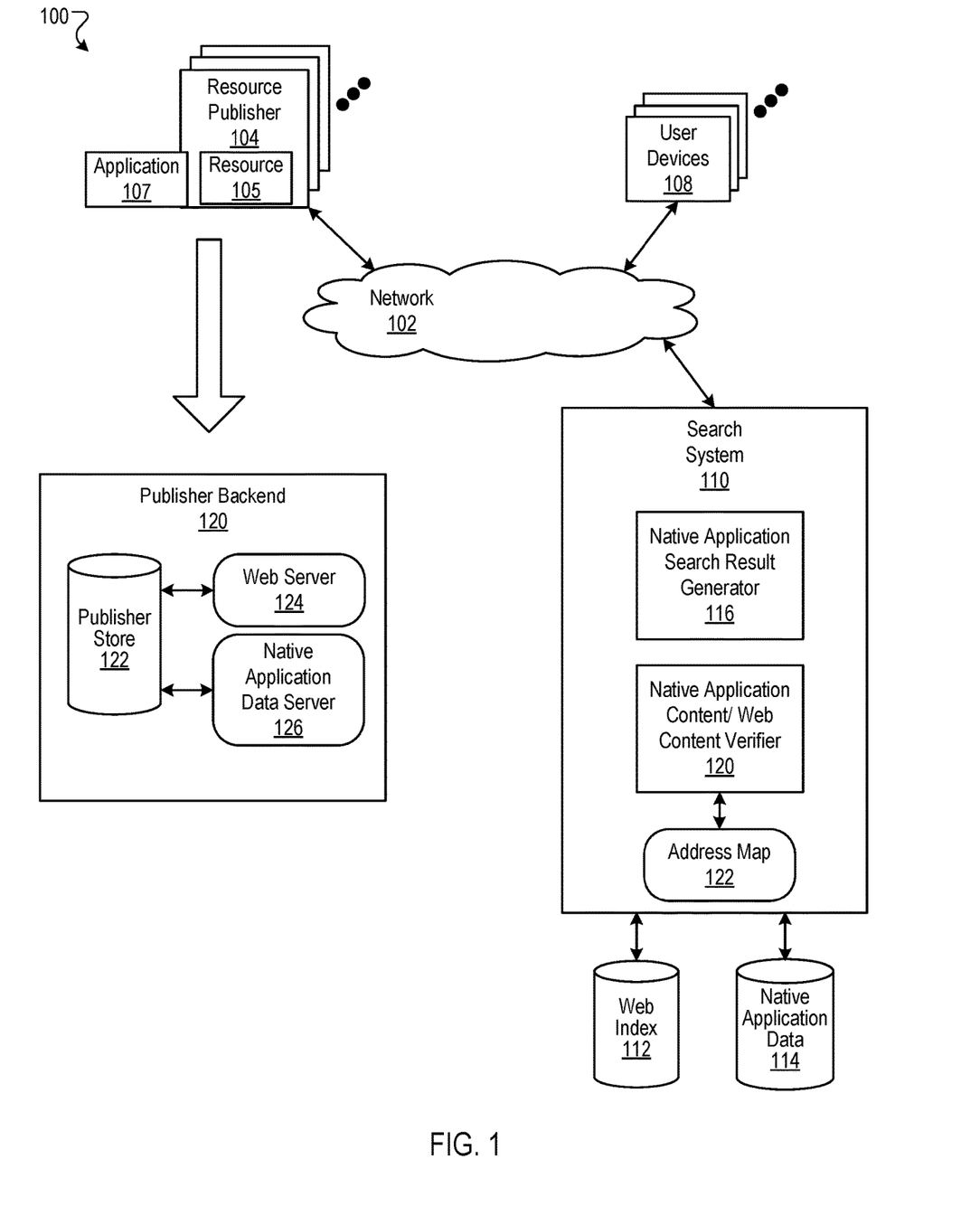
FIG. 1 is a block diagram of an example environment in which content for native applications are subject to being verified as consistent with web content.

FIG. 1 is a block diagram of an example environment 100 in which content for native applications are subject to being verified as consistent with web content. A computer network 102, such as the Internet, connects resource publisher web sites 104, which may also be application publishers, user devices 108 and a search system 110.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each website 104 is maintained by a content publisher, which is an entity that controls, manages and/or owns the website 104.

A web page resource 105 is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts. The resources may be optimized for desktop environments or mobile environments, especially when the publisher 105 maintains a mobile presence.

A resource publisher 104 may also be a native application publisher that provides a native application 107. As described above, a native application 107 is an application specifically designed to run on a particular user device operating system and machine firmware. Many publishers 104 provide the same content in both web resources and native applications. The management of the delivery of such content is handled by a publisher backend 120. The publisher backend 120 includes a publisher store 122 that stores content the publisher provides, a web server 124 that provides the content from the publisher store as web resources (e.g., web pages), and a native application data server 126 that handles requests from a native application. The content of the publisher store 122 is accessible for presentation on both the web resources and the native application. Accordingly, such content is referred to as "consistent" content.

Examples of such publishers are news publishers, which may have a "mobile news app" for reading news content on a mobile device. The news content (e.g., the text of a news story) provided on the web resource 105 are the same, or very similar to, content that is provided by the native application 107.

The architecture of the publisher backend 120 is illustrative only, and other systems that are designed to provide consistent content to two or more different environments can also be used.

A user device 108 is an electronic device that is under the control of a user. A user device 108 is typically capable of requesting and receiving web page resources 105 and native applications 107 over the network 102. Example user devices 108 include personal computers, mobile communication devices, and tablet computers.

The web index 112 is an index of publisher content that has, for example, been built from crawling the publisher web sites 104, by receiving data feeds from the publisher web-sites 104, or by other appropriate methods of collecting and indexing data.

The native application index 114 stores data relating to native applications 107. The application index 114 stores, for example, a list of native applications provided by the publishers 105 and identifiers that identify the native applications. Furthermore, in some implementations, publishers 104 may specify that certain native applications 107 are used to access and display consistent data, and this information may be stored in the application index. For example, a news publisher of may specify that a news reading application it provides displays consistent content that is displayed on the news publisher's website. Data specifying this relationship may be, for example, a tuple that pairs a native application identifier with the domain name (or other identifiers or resource locators) of the publisher, and addresses pairs that describe pairs of addresses for the native application and the web resources that provide consistent content.

The user devices 108 submit search queries to the search system 110. In response to each query, the search system 110 accesses the web index 112 and the application index 114 to identify content that is relevant to the query. The search system 110 may, for example, identify the resources and applications in the form of web resource search results and native application search results, respectively. Once generated, the search results are provided to the user device 108 from which the query was received.

A web resource search result is data generated by the search system 110 that identifies a web resource, based on the content of the resource that satisfies a particular search query. A web resource search result for a resource can include a web page title, a snippet of text extracted from the resource, and a uniform resource identifier (URI) for the resource, e.g., the uniform resource locator (URL) of the web page. When selected at a user device, the web resource search result causes the user device to generate a request for the resource located at the URL. The web resource that is received is then displayed in a browser application.

A native application search result specifies a native application. The native application search result generator 116 generates the native application search result in response to a search of the application index 114 and/or the web index 112, as described in more detail below. When selected at a user device, the native application search result causes the native application installed on the user device to request the consistent content. Once the native application receives the requested content, the native application displays the content in a user interface of the native application.

As described above, content addresses content addresses, URI's, URL's, or command line parameters, for a native application and a corresponding web resource address that is purported to provide the same or similar content as the native application may be provided by publishers or third parties. One example of such content addresses are deep links, which is an instruction specifying a particular environment instance of a native application and configured to cause the native application to instantiate the environment instance of the specified native application when selected at a user device. The deep link may include particular addresses to which the native application is to address content requests. Alternatively, the addresses may be stored within the executable of the native application, and each time the native application is instantiated it requests content from the addresses. In such situations the publisher can provide the addresses, or a system such as the native application content/web content verifier 120, described in more detail below, can instantiate the native application and monitor addresses to which the native application sends content requests.

The native application content/web content verifier 120 verifies whether content from a native application and content for a corresponding web resource is consistent. The content verifier 120 accesses an address map 122 that stores a list of address pairs for native applications and websites. The address pairs can be provided by the publisher or third parties, or can be derived by the content verifier 120, or both. Operation of the content verifier 120 is described in more detail with reference to FIGS. 2 and 3 below.

Figure 2:
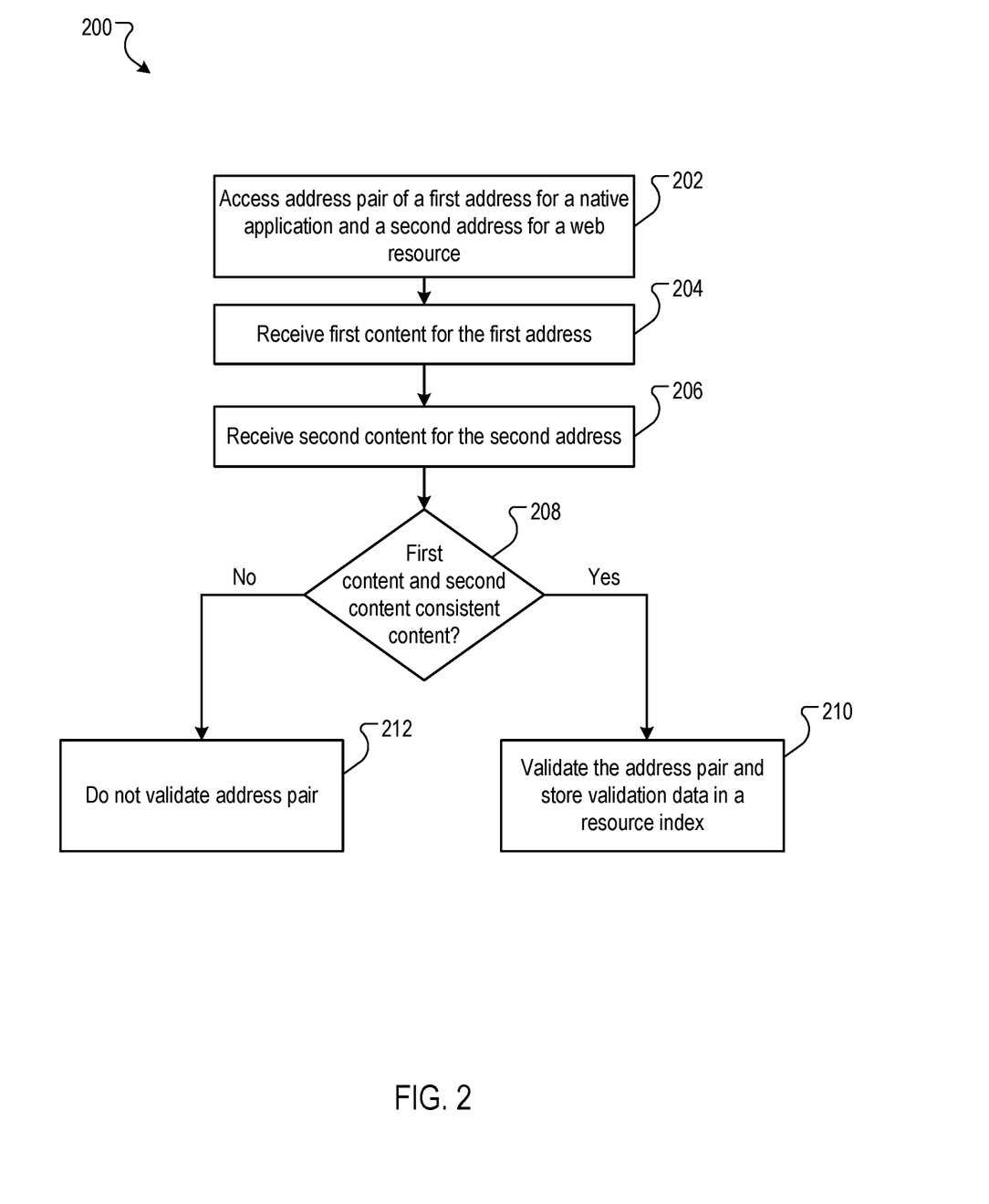
FIG. 2 is a flow diagram of an example process for verifying native application content.

FIG. 2 is a flow diagram of an example process 200 for verifying native application content. The process 200 can be implemented in a data processing apparatus of one or more computers in data communication.

The process 200 accesses an address pair of a first address for a native application and a second address for a web resource (202). Each address pair is a first address and a corresponding second address. Each first address being accessible by the native application and from which the native application receives first content, and each second address is an address for a web resource that respectively provides second content. Again, the address pairs can be provided as described above. Alternatively, in some implementations, the content verifier can monitor content requests issued from the native application. If the content requests are reconcilable to a web address of a web resource, such as a URL, for example, then the two addresses are stored as an address pair.

The process 200 receives first content for the address (204). The content verifier 120, for example, may execute the native application and monitor data that is received in response to the content requests of the native application. The content can be collected in a variety of ways. For example, a data processing apparatus can be instrumented to interrogate text handlers, list handlers and view handlers of the native application to extra text and image data for processing. Alternatively or in addition, responses to content requests can be monitored and data extracted from the responses. Other appropriate ways of collection data provided to and/or displayed by the native application can also be used.

The process 200 receives second content for the second address (206). In the case of a web resource, the content that is received is, for example, content that is to be rendered as part of a mark-up language document of a browser. For other environments, the same or similar data collection processes as described with reference to step (204) above can be used.

The process 200 determines if the first content and the second content are consistent content (208). The content is determined to be consistent if one or more comparison processes, such as entity matching, n-gram similarity, phrase matching, and feature similarity, indicate a threshold level of consistency between the first and second content. A more detailed example process for determining whether the content for the native application and the content for the web resource are consistent is described with reference to FIG. 3 below.

If the process 200 determines that the first content and the second content are consistent content, then the process 200 validates the address pair and stores validation data in a resource index (210). For example, a record for a URL in the web index 112 may be updated to include the address for the native application and an identifier of the native application. This search system 110, when processing search results at a later time, can then generate a corresponding native application search result if the web resource referenced by the URL is to be provided to a user device as a web search result. The generation of the native application search result for a web search result is described in more detail with reference to FIGS. 4 and 5 below.

Conversely, if the process 200 does not determine that the first content and the second content are consistent content, then the process 200 does not validate the address pair (212). Thus, for native application addresses that are determined to not have content consistent with a corresponding web resource, a native application search result for that address will not be generated.

Figure 3:
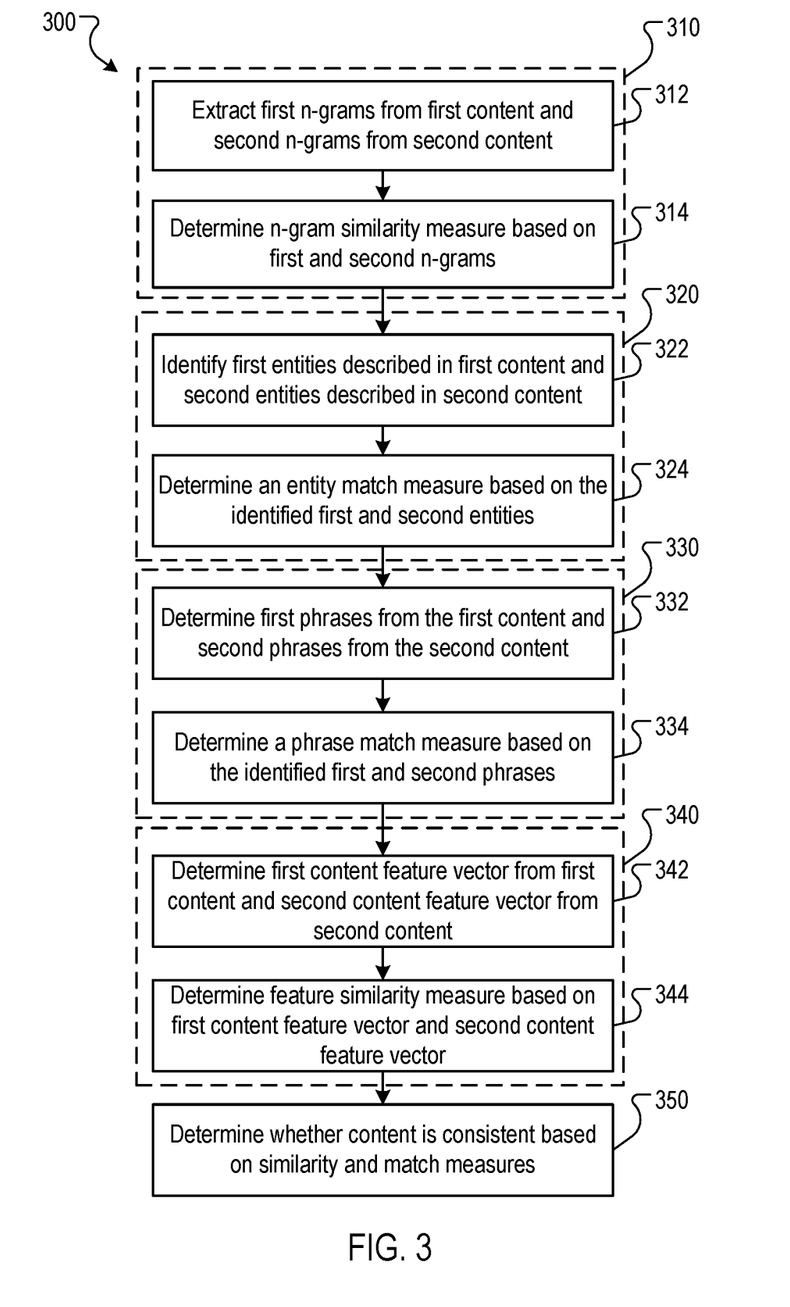
FIG. 3 is a flow diagram of example validation processes.

FIG. 3 is a flow diagram of example validation processes. The process 300 can be implemented in a data processing apparatus of one or more computers in data communication. The process 300 can include one or more content consistency checks. For example, as shown in FIG. 3, the consistency checks include an n-gram similarity check 310, an entity matching check 320, a phrase matching check 330, and a feature vector similarity check 340. Each process check generates data, such as similarity or match measures, that are indicative of the level of consistency between the content of the native application and the content of the web resource.

The process 300 extracts first n-grams from the first content and second n-grams from the second content (312). The n-grams may be, for example, bi-grams and tri-grams. The content can be parsed to produce the n-grams, or the n-grams may be extracted if they exist in a predefined dictionary of n-grams.

The process 300 determines an n-gram similarity measure based on the first and second n-grams (314). The higher the similarity measure is, the higher the consistency is between the first and second content. A variety of similarity measurement processes may be used. For example, identified n-grams may be used to populate a sparse vector for each content set, and the similarity may be based on a cosine similarity score. Other similarity measurement processes can also be used.

In some implementations, the formatting, position, or prominence of the n-grams may be used to weight the n-grams. For example, n-grams in titles may be weighted higher than n-grams in headings, and n-grams and headings may be weighted higher than n-grams in text subordinate to the heading, and so on. Based on these relative weights, matches of n-grams in titles or headings can thus be more indicative of consistent content than matches of n-grams in text subordinate to the heading.

The n-grams may also be weighted in inverse proportion to their respective frequencies. This is based on the premise that rare n-grams are more indicative of the underlying content that very frequent n-grams. To illustrate, n-grams such as stop words or commonly occurring words occur much more frequently than n-grams such as a person's name, or the name of a location, etc. Again, based on these relative weights, matches of less frequent n-grams are thus be more indicative of consistent content than matches of very frequent n-grams.

The process 300 identifies first entities described in the first content and second entities described in the second content (322). The entities that are identified are particular topic of discourse, such as distinct concepts or things that are nodes in a knowledge graph. Entities mapped in the knowledge graph are connected by entity relations.

The process 300 determines an entity match measure based on the identified first and second entities (324). The entity match measure measures the matches between the first entities and the second entities, and is proportional to the number of entities matched and the number of entities identified. Matches between identified entities are a signal of consistency, while mismatches are a signal of inconsistency.

The process 300 determines first phrases from the first content and second phrases from the second content (332). In some implementations, phrases differ from n-grams in that phrases are usually separated by punctuation and determined by language models, or are set off by content formatting, or offset by mark-up tags. For example, the content may include a number of entries formatted according to the pattern of a main heading, followed by list headings subordinate to the main heading, and where each list heading includes a paragraph of text subordinate to the list heading. The text of each of the main heading, list headings, and paragraphs may each be considered a separate phrase for phrase matching.

The process 300 determines a phrase match measure based on the identified first and second phrases (334). The phrase match measure measures the matches between the first phrases and the second phrase, and is proportional to the number of phrases matched and the number of phrases identified. Matches may be identified by exact matches, matches based on an edit distance threshold being met, or based on one or more other matching techniques. Matches between identified phrases are a signal of consistency, while mismatches are a signal of inconsistency.

The process 300 determines a first content feature vector from first content and a second content feature vector from second content (342). The feature vectors represent formatting features of the content. For example, the feature vectors may describe the title, headings, and subheadings, and the corresponding content.

The process 300 determines a feature similarity measure based on first content feature vector and second content feature vector (344). The feature similarity measure measures the similarity between the first content and the second content based on the features. A variety of similarity measurement processes may be used. The higher the similarity measure is, the higher the consistency is between the first and second content.

The process 300 determines whether the content is consistent based on similarity and match measures (350). The content of the native application can be determined to be consistent if any one consistency check measures passes a threshold, or alternatively, if a majority of consistency check measures pass respective threshold, or based on some other function of the consistency check measures.

The processes above are described in the context of a single web resource or single website for a native application. However, many publishers may maintain multiple different sites. For example, many publishers have a first site optimized for desktop devices and a second site optimized for a mobile device. The native application may also have addresses for each of these sites. In such situations, if the native application content is consistent with either of the sites, then the content is determined to be consistent.

In some implementations, repetitive or "boilerplate" content present in a web resource and/or present in a native application can be discounted or ignored when making consistency determinations. Boilerplate content is discounted or ignored because the informational value of boilerplate content is often less, much less than non-boilerplate content. A variety of boilerplate detection processes can be used to detect boilerplate, including historical content detection, detection of same content from multiple addresses, and so on.

Figure 4:
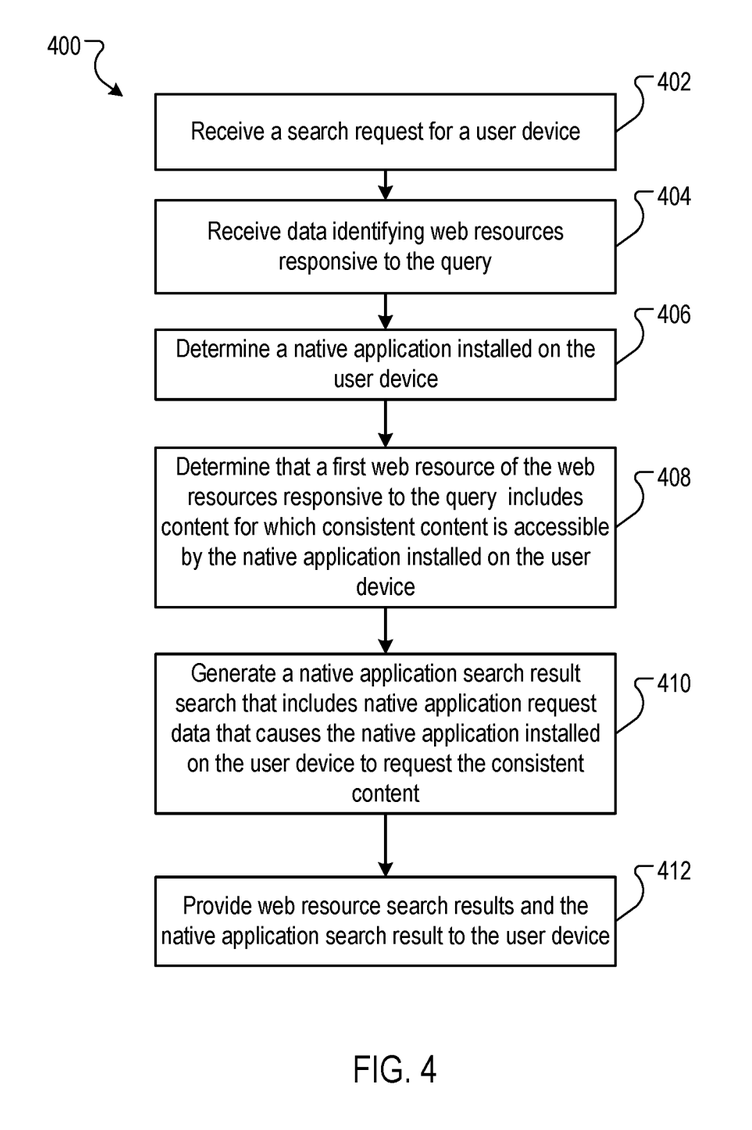
FIG. 4 is a flow diagram of an example process for generating and providing native application search results.

The identification of native applications and the generation of native application search results described with reference to FIG. 1 are described in more detail with reference to FIG. 4, which is a flow diagram of an example process 400 for generating and providing native application search results. The process 400 can be implemented in a data processing apparatus of one or more computers in data communication.

The process 400 receives a search request for a user device (402). The search request includes a query that includes one or more terms and identification data for identifying native applications installed on the user device. As shown in FIG. 1, flow element 1 depicts a search request transmitted from a user device to the search system 110.

In some implementations, the identification data are native application identifiers that identify native applications installed on the user device. For example, a browser application can be configured to access registry data or other configuration data of the user device that includes a list of installed native applications. Alternatively, in another implementation, the identification data for identifying native applications installed on the user device is a user device identifier that uniquely identifies the user device. The search system 110 (or another system in data communication with the search engine) can accesses account data for the device identifier, where the account data specifies native applications installed on the device. The account, for example, may be a user account through which a user purchases native applications for installation on the user device. If the account is tied to more than one user device, where each device may have different native applications installed, then the identification data can be a combination of the device identifier and an account identifier different from the device identifier. As both identifiers are tied to the account, the account data specifies the native applications installed on each user device tied to the account. The account data can be stored in the native application data 114, or be accessible by the native application search result generator 116.

The process 400 receives data identifying web resources responsive to the query (404). For example, the native application search result generator 116 receives data identifying resources that are determined to be responsive to the query. An example of such data is a list of URL's (or other resource identifiers), and, for each resource, a score indicating the relevance of the content of the resource to the query. The search system 110 may determine the web resources that are responsive and provide the data to the native application search result generator 116.

The process 400 determines a native application installed on the user device (406). For example, the native application search result generator 116 processes the identification data provided in the search request to determine the native applications. If the identification data are a list of native application identifiers, then the native application search result generator 116 accesses the native application data 114 using the native application identifiers. Alternatively, if identification data for identifying native applications installed on the user device is a user device identifier (and/or account identifier) that uniquely identifies the user device, then the native application search result generator 116 accesses the native application data to search the account data (or accesses the account data if the account data are not stored in the native application data 114) to determine the native applications installed on the user device.

The process 400 determines that a first web resource of the web resources responsive to the query includes content for which consistent content is accessible by the native application installed on the user device (408). For example, a first web resource may be published by a resource publisher having a first domain name. The publisher 104 may have specified that a particular native application that was identified in step 406 is used to access and display consistent data that would be displayed in the first web resource. The content verifier 120, having verified the address pairs of the native applications, has stored verification data in the index 112, which indicates a native application search result for the first web resource is available. Accordingly, the first web resource is determined to include content for which consistent content is accessible by the native application installed on the user device.

The process 400 generates a native application search result search that includes native application request data that causes the native application installed on the user device to request the consistent content (410). The native application search result includes request data the causes the native application to request the content that would be displayed in the first web resource. The type of request data that is provided depends on the native application. For example, some native applications can accept a URL of a web page as input and then transmit the URL of the web page to a native application data server 126 in the publisher backend 120. The native application data server 126 then uses the URL to access the publisher store 122 and identify the content to provide to the native application. For example, the native application data server 126 may be configured to extract the corresponding content for each web page resource and provide the content to the native application. In such implementations, the native application search result may include a command line with the URL as a command line argument that is passed to the publisher backend 120 when the native application is launched in response to a selection of the native application search result.

The process 400 provides web resource search results and the native application search result to the user device (412). For example, the providing of the web resource search results and the native application search result are depicted in FIG. 1 by flow element 2. Upon receipt, the user device 108 renders the search results for display.

Figure 5:
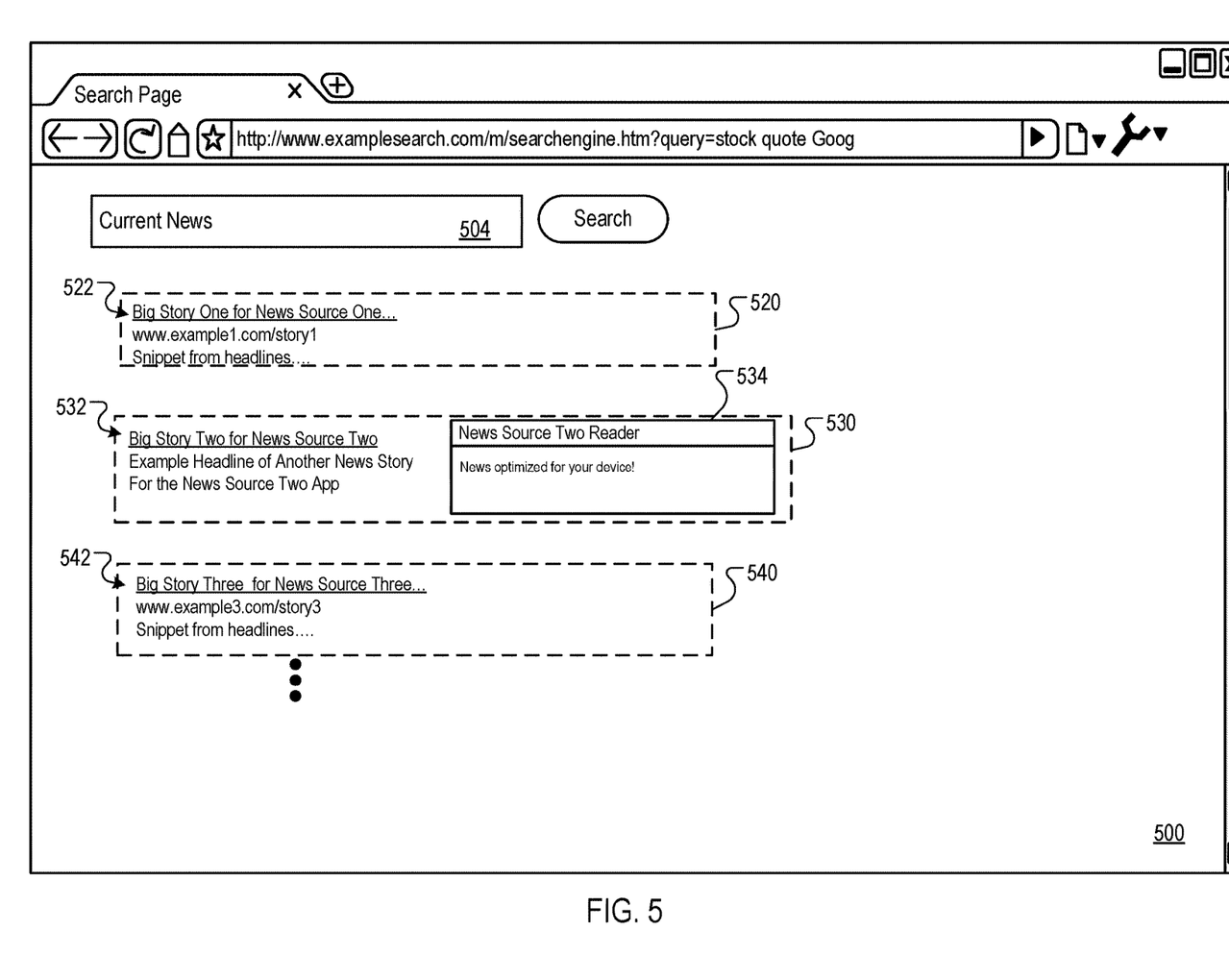
FIG. 5 is an illustration of a search results page that includes a native application search result.

FIG. 5 is an illustration of a search results page 500 that includes a native application search result. Displayed in the search results page 500 are search results 520, 530, and 540 that are responsive to the query "current news" displayed in the search input field 504. The search results 520 and 540 are web search results generated in response to a search of a web index 112 of resources. Each search result 520 and 540 references a resource that can be rendered in a browser application on a user device and includes a URL link to the resource, and other data 522 and 542, such as a snippet of text extracted for the referenced resource.

The search result 530 is a native application search result that is generated in response to the native application search result generator 116 determines that web resource includes content for which consistent content is accessible by the native application installed on the user device. The native application search result 530 may include, for example, a snippet 532 of text and an image 534 of the native application display. The snippet 532 may be extracted from the web resource. In this example, the snippet 532 is a headline and text of a news story. The image 534 may be, for example, an image of a user interface of the native application. The image 534 helps visually distinguish the native application search result 530 from the web resource search results.

Embedded in the native application is request data that the native application uses to request content upon launching. The request data may be, for example, the URL of the resource that includes the consistent content. The URL, however, is not shown so as to avoid confusion that the native application search result 530 is a web resource search result. In some implementations, selection of the image 534, or any other portion of the native application search result 532, at the user device causes the native application to launch and request the content that is relevant to the search query. Note that if the native application were not installed on the user device 108, then the search result 530 would be a web resource search result instead of a native application search result. Likewise, if a native application for "News Source Three" were installed on the user device 108, then the web search result 540 would be a native application search result that would invoke the native application for "News Source Three."

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus comprising one or more computers in data communication, the method comprising:
   accessing, for a native application installed on a user device, index validation data storing address pairs of first addresses and second addresses and validation data for the address pair, wherein:
      each address pair includes a first address used to access web-based multimedia content presented at the native application and a corresponding second address used to access web-based multimedia content presented at a browser application, each first address being accessible by the native application and from which the native application receives first content and displays the first content on the user device, and each second address being an address for a web resource that respectively provides second content for display at the user device; and
      the validation data for the address pair indicates that, based on a comparison of the first content that the native application displays on the user device to the second content that the browser application displays on the user device, the first content and the second content are determined to be consistent content based on one or more similarity match measures meeting respective match thresholds that indicate the first content and the second content meet a threshold similarity indicating the first content and the second content are the same or similar content, wherein the first content is received at the native application based on an instruction that indicates the first address to which the native application directs content requests;
   receiving a search request for a user device, the search request including a query that includes one or more terms;
   receiving data identifying web resources responsive to the query;
   determining that a first web resource of the web resources responsive to the query is addressed by a second address of a validated address pair for the native application and in response to this determination generating a native application search result that includes the first address of the validated address pair; and
   providing web resource search results and the native application search result to the user device.

2. The computer-implemented method of claim 1, wherein the comparison of the first content to the second content is based on an n-gram similarity measure based on first n-grams of the first content and second n-grams of the second content, wherein the n-gram similarity measure measures the similarity between the first content and the second content.

3. The computer-implemented method of claim 1, wherein the comparison of the first content to the second content is based on an entity match measure that measures a match between first entities described in the first content and second entities described in the second content.

4. The computer-implemented method of claim 1, wherein the comparison of the first content to the second content is based on a feature similarity measure based on first content feature vector that represents formatting features of the first content and second content feature vector that represents formatting features of the second content, wherein the feature similarity measure measures the similarity between the first content and the second content.

5. A non-transitory computer readable storage medium storing instructions executable by a data processing apparatus and that upon such execution cause the data processing apparatus to perform operations comprising:
   accessing, for a native application installed on a user device, index validation data storing address pairs of first addresses and second addresses and validation data for the address pair, wherein:
      each address pair includes a first address used to access web-based multimedia content presented at the native application and a corresponding second address used to access web-based multimedia content presented at a browser application, each first address being accessible by the native application and from which the native application receives first content and displays the first content on the user device, and each second address being an address for a web resource that respectively provides second content for display at the user device; and
      the validation data for the address pair indicates that, based on a comparison of the first content that the native application displays on the user device to the second content that the browser application displays on the user device, the first content and the second content are determined to be consistent content based on one or more similarity match measures meeting respective match thresholds that indicate the first content and the second content meet a threshold similarity indicating the first content and the second content are the same or similar content, wherein the first content is received at the native application based on an instruction that indicates the first address to which the native application directs content requests;

receiving a search request for a user device, the search request including a query that includes one or more terms;

receiving data identifying web resources responsive to the query;

determining that a first web resource of the web resources responsive to the query is addressed by a second address of a validated address pair for the native application and in response to this determination generating a native application search result that includes the first address of the validated address pair; and providing web resource search results and the native application search result to the user device.

6. The non-transitory computer readable storage medium of claim 5, wherein the comparison of the first content to the second content is based on an n-gram similarity measure based on first n-grams of the first content and second n-grams of the second content, wherein the n-gram similarity measure measures the similarity between the first content and the second content.

7. The non-transitory computer readable storage medium of claim 5, wherein the comparison of the first content to the second content is based on an entity match measure that measures a match between first entities described in the first content and second entities described in the second content.

8. The non-transitory computer readable storage medium of claim 5, wherein the comparison of the first content to the second content is based on a feature similarity measure based on first content feature vector that represents formatting features of the first content and second content feature vector that represents formatting features of the second content, wherein the feature similarity measure measures the similarity between the first content and the second content.

9. A system, comprising:

a data processing apparatus; and software stored in non-transitory computer readable storage medium storing instructions executable by the data processing apparatus and that upon such execution cause the data processing apparatus to perform operations comprising:

accessing, for a native application installed on a user device, index validation data storing address pairs of first addresses and second addresses and validation data for the address pair, wherein:

each address pair includes a first address used to access web-based multimedia content presented at the native application and a corresponding second address used to access web-based multimedia content presented at a browser application, each first address being accessible by the native application and from which the native application receives first content and displays the first content on the user device, and each second address being an address for a web resource that respectively provides second content for display at the user device; and the validation data for the address pair indicates that, based on a comparison of the first content that the native application displays on the user device to the second content that the browser application displays on the user device, the first content and the second content are determined to be consistent content based on one or more similarity match measures meeting respective match thresholds that indicate the first content and the second content meet a threshold similarity indicating the first content and the second content are the same or similar content, wherein the first content is received at the native application based on an instruction that indicates the first address to which the native application directs content requests;

receiving a search request for a user device, the search request including a query that includes one or more terms;

receiving data identifying web resources responsive to the query;

determining that a first web resource of the web resources responsive to the query is addressed by a second address of a validated address pair for the native application and in response to this determination generating a native application search result that includes the first address of the validated address pair; and providing web resource search results and the native application search result to the user device.

10. The system of claim 9, wherein the comparison of the first content to the second content is based on an n-gram similarity measure based on first n-grams of the first content and second n-grams of the second content, wherein the n-gram similarity measure measures the similarity between the first content and the second content.

11. The system of claim 9, wherein the comparison of the first content to the second content is based on an entity match measure that measures a match between first entities described in the first content and second entities described in the second content.

12. The system of claim 9, wherein the comparison of the first content to the second content is based on a feature similarity measure based on first content feature vector that represents formatting features of the first content and second content feature vector that represents formatting features of the second content, wherein the feature similarity measure measures the similarity between the first content and the second content.

* * * * *